United States Patent [19]
Lavender

[11] 3,850,784
[45] Nov. 26, 1974

[54] RELEASE LINER FOR PRESSURE SENSITIVE ADHESIVE

[75] Inventor: Ardis R. Lavender, Hines, Ill.

[73] Assignee: Ardis S. Lavender, Hines, Ill.

[22] Filed: Jan. 26, 1973

[21] Appl. No.: 326,849

[52] U.S. Cl. .................. 161/88, 161/89, 161/167, 161/182, 161/190, 161/206, 161/227, 161/247, 161/270, 161/406
[51] Int. Cl. ............................................. C09j 7/02
[58] Field of Search ....... 161/89, 88, 166, 167, 182, 161/190, 206, 227, 247, 270, 406

[56] References Cited
UNITED STATES PATENTS
3,639,500  2/1972  Muny................................ 161/406

*Primary Examiner*—Marion E. McCamish
*Attorney, Agent, or Firm*—Prangley, Dithmar, Vogel, Sandler & Stotland

[57] ABSTRACT

An article of manufacture and method of making the same, the article comprising a release liner for a water insoluble, pressure sensitive adhesive including a water impermeable film and a water holding material wherein the water holding material is applied against the adhesive and the water impermeable film prevents water from evaporating from the water holding material. A release liner is disclosed including a carrier having a water impermeable film on one side and a water holding material on the other.

28 Claims, 4 Drawing Figures

PATENTED NOV 26 1974    3,850,784

RELEASE LINER FOR PRESSURE SENSITIVE ADHESIVE

This invention relates to a release liner for a water insoluble, pressure sensitive adhesive and more particularly, relates to a release liner including a water holding material and a water impermeable film and to a method of making the same.

There is a class of adhesives useful in industry which is known as pressure sensitive or contact adhesives. This invention relates to water insoluble, pressure sensitive or contact adhesives. While the contact adhesives commercially sold may be modified extensively to alter their adhesive properties, this invention pertains to the entire spectrum of water insoluble, pressure sensitive adhesive of which the following are only illustrative examples: silicone resin and gum adhesives, polyurethane adhesives, acrylic adhesives, various modified acrylic adhesives, and rubber based contact adhesives. Although the above class of adhesives may vary substantially in their chemical compositions, all of these adhesives have similar problems in use which the present invention obviates.

Whenever possible, contact adhesives are applied to a substrate in a thin film by primary manufacturers of for example adhesive tape, self-adhering tiles, or for instance producers of declomania. The adhesive film is then protected by a release film or liner to which the adhesive does not fixedly adhere. Many contact adhesives have adhesive properties which are so good that without serious modification of the adhesive to decrase its adhesive power, there is no release liner presently available which can be used therewith. Another problem with contact adhesives of the class described, is that after they are layed on a substrate whatever surface comes in contact with them immediately adheres thereto and may not be removed to be repositioned. This latter problem is particularly troublesome when laying floor tiles or for instance plastic desk tops or other plastic coverings for furniture.

Accordingly, it is the principle object of the present invention to provide a release liner and a method of making the same, the liner including a film having a wtaer impermeable side and a water holding side, whereby the release liner placed on a water insoluble, pressure sensitive adhesive with the water holding material in contact with the adhesive provides a protective release liner which is easily removable to expose the adhesive in condition for use.

Another object of the present invention is to provide an article and method of the type set forth wherein the water holding side has a water holding cross-linked synthetic organic resin.

Another object of the present invention is to provide a release liner of the type set forth, the release liner including a carrier having opposed surfaces, a water impermeable film carried by the carrier on one surfce thereof, and a water holding material carried by the carrier on the other surface thereof, whereby the carrier with the water holding material on one surface thereof placed on a water insoluble, pressure sensitive adhesive provides a protective release liner which is easily removable from the adhesive to expose the adhesive in condition for use.

Still another object of the present invention is to provide a substrate having a water insoluble, pressure sensitive adhesive on one surface thereof, a release liner including a water impermeable side and a water holding side with the water holding side overlying the adhesive, whereby the release liner is easily peelable from the water insoluble, pressure sensitive adhesive to expose the adhesive in condition for use.

A further object of the present invention is to provide a substrate and release liner of the type set forth wherein a water holding cross-linked synthetic organic resin is carried on one surface of the carrier and a water impermeable film is carried on the other surface of the carrier.

A still further object of the present invention is to provide a substrate and a release liner of the type set forth wherein a water impermeable film covering the edges of the release liner and the adhesive is provided to prevent water from evaporating therefrom.

These and other objects of the present invention together with further objects and advantages thereof will best be understood by reference to the following specification taken in connection with the accompanying drawings wherein.

Figure 1:
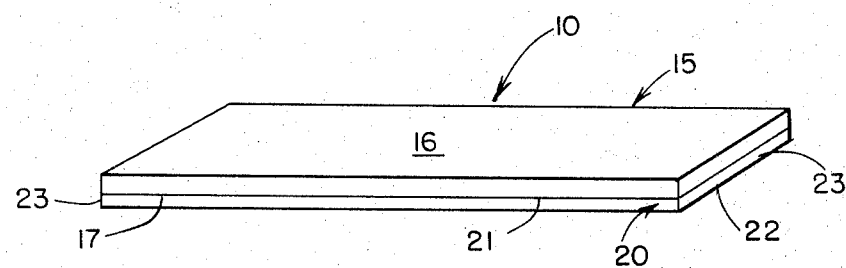
FIG. 1 is a perspective view of a release liner incorporating the objects of the present invention.

As hereinbefore set forth, there are a wide variety of proprietary water insoluble, pressure sensitive adhesives. Each of the various proprietary compounds has slightly different adhesive properties and will, therefore, adhere or stick to various substrates. In general, a majority of the presently available water insoluble, pressure sensitive adhesives will stick to a wide variety of substrates including metal, wood, paper, fabric, synthetic organic resins and various combinations thereof. Regardless of the precise adhesive properties of the particular proprietary compounds, the release liners of the present invention are effective so long as the adhesives themselves are water insoluble.

Referring now to the drawings there is disclosed a release liner 10 including a water impermeable membrane or film 15 having an exposed surface 16 and a surface 17 opposite thereto. Secured to the impermeable film 15 is a water holding material 20 having one surface thereof 21 in contact with the surface 17 of the water impermeable film 15. The water holding material 20 has the other surface 22 thereof exposed and in condition to be overlayed against a water insoluble, pressure sensitive adhesive of the type hereinbefore set forth. The water holding matrial 20 has end surfaces 23, which end surfaces are exposed and through which water may evaporate. Due to the extremely small surface area of the edges 23 as compared with the surfaces 21 and 22, relatively little water is lost by evaporation and not enough to affect the release liner 10 except as hereinafter set forth.

Figure 2:
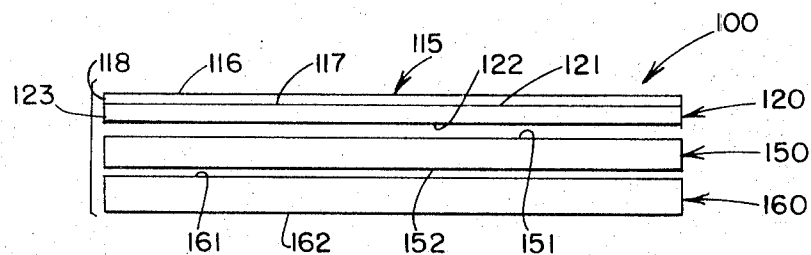
FIG. 2 is an exploded side view of a release liner and substrate.

Referring now to FIG. 2 there is disclosed a release liner 100 having a water impermeable film 115 with opposed surfaces 116 and 117, the water impermeable film also having edge surfaces 118. The water impermeable film overlays a water holding material 120, the water holding material being in the form of a film having surfaces 121 and 122. The water holding material 120 also has end surfaces 123, the film 120 overlying an adhesive 150. The adhesive 150 is a water insoluble, pressure sensitive adhesive and has surfaces 151 and 152, the surface 152 being overlaid on a substrate 160 which has a surface 161 and a surface 162. The substrate 160 may be any material such as metal, wood, paper, fabric, synthetic organic resins or any combination thereof. The water insoluble, pressure sensitive adhesive 150 overlays the substrate 160 and more particularly the surface 152 of the adhesive is in intimate contact and bonded to the surface 161 of the substrate. The bond thus formed is permanent. The other surface 151 of the adhesive 150 is overlaid by the water holding material 120 of the release liner 100 and more particularly, the surface 151 of the adhesive 150 is in intimate contact with the surface 122 of the release liner 100. In contradistinction to the bond between the surface 161 of the substrate 160 and the surface 152 of the adhesive 150, the bond between the surface 151 of the adhesive and the surface 122 of the water holding material is easily broken and allows the release liner 100 to be peeled away from the adhesive thereby exposing the surface 151 thereof in condition for use. The presence of the water impermeable film 115 prevents water from evaporating from the water holding material 120 and since the adhesive 150 is water insoluble, the water held by the water holding material 120 remains trapped therein and facilitates the removal of the liner 100 from the adhesive 150. The only exposed surfaces of the water holding material 120 are at the ends 123 thereof; however, the surface area of the ends 123 is so small as compared to the surface area of the surfaces 121 and 122 that the evaporation at the ends 123 has little effect on the releasability of the liner 100, except as hereinafter set forth.

Figure 3:
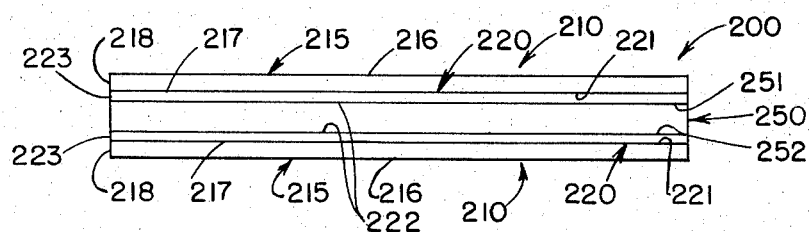
FIG. 3 is a side view of a combination of two release liners on two sides of a layer of adhesive.

Referring now to FIG. 3 of the drawings, there is disclosed a construction 200 which includes two release liners 210 on opposite sides of a layer of adhesive 250. More particularly, each of the release liners 210 include a water impermeable film 215 having an exposed surface 216 and an inner surface 217. Each of the water impermeable films has end surfaces 218 and carry on the inner surface 217 a water holding material 220. The water holding material 220 is in the form of a film and has a surface 221 in contact with and carried by the surface 217 of the water impermeable film 215 and has a surface 222 opposite thereto. Each of the water holding films 220 have end surfaces 223 thereof. Intermediate the two release liners 210 and more particularly intermediate the inner surface 222 of each of the water holding films 220 there is exposed an adhesive layer 250 having a surface 251 thereof in contact with one of the release liners 210 and a surface 252 thereof in contact with the other of the release liners 210. Since both of the release liners 210 may be peeled away, the construction 200 may have one of the release liners 210 removed thereby exposing the surface 251 of the adhesive 250 in condition for use. After the adhesive 250 has been firmly fixed to a substrate, the other release liner may be removed thereby exposing the surface 252 in condition for use. Thereafter, the adhesive 250 and more particularly the surface 252 threof may be secured to yet another substrate. Removal of one of the release liners 210 has no adverse effect on the other of the release liners since the adhesive 250 is water insoluble thereby preventing evaporation of water from the remaining water holding material 220 through the adhesive 250.

Figure 4:
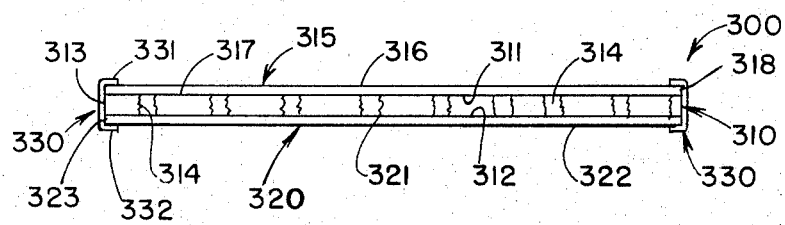
FIG. 4 is a second embodiment of the release liner shown in FIG. 1.

Referring now to FIG. 4 there is shown another embodiment of the present invention wherein a release liner 300 includes a carrier 310 having opposite surfaces 311 and 312 and end surfaces 313. On the surface 311 of the carrier 310 there is laid a water impermeable film 315 having an exposed surface 316 and an inner surface 317 and end surfaces 318. On the surface 312 of the carrier 310 there is disposed a water holding material 320 having an inner surface 321 in contact with the surface 312 and an exposed surface 322, the water holding material having end surfaces 323. The release liner 300 is particularly useful in that a mechanical lock is provided between the carrier 310, the water impermeable film 315 and the water holding material 320 as at the interstices 319 of the carrier 314, thereby firmly to lock both the water impermeable film and the water holding material in place.

If the release liner 300 is stored for a long time at high temperatures and relatively low humidity, some water will evaporate from the edges of the release liner after it is overlaid on a substrate having an adhesive thereon, all as shown in FIG. 2. In order to prevent evaporation of water through the edges, there is provided a water barrier 330 at the edges of the release liner 300, the barrier 330 being in the form of a water impermeable film which may have overlapping edges 331 and 332. Since the water impermeable film may become fixedly secured to the adhesive when the release liner 300 is used, as shown in FIG. 2, it is desirable to have the water barrier cover only the exposed edges of the release liner and the adhesive. To that end, the water barrier 300 may be applied after the release liner has been overlaid onto the adhesive, thereby reducing the possibility of having the overlapping edges 332 which may stick to the adhesive. Since the water barrier 330 is very thin, there is no difficulty in stripping the release liner 330 from the adhesive. Since all surfaces of the release liner are covered by water insoluble and water impermeable materials, a release liner laid on a water insoluble adhesive and protected at the edges by a water barrier is storable for long periods of time.

As hereinafter set out by way of example, it will be apparent that the carrier may be any material capable of forming a mechanical lock with the water impermeable film and water holding material. Representative examples of the carrier are non woven cloth, cloth, paper, mesh, netting, of foam films. The water impermeable film may be any film through which water will not pass such as polyester films, polyvinyl copolymer films and the like. The water holding material may be any material which holds water such as synthetic organic resin gels such as cross-linked polyvinyl alcohol, cross-linked polysaccharide, cross-linked polyvinyl pyrollidine or polyacrylamide. Additionally, grains such as corn, rice or tapioca which can be cross-linked in the presence of water to form a water holding material are useful in the present invention. Water absorbent paper and cloth are also useful, all as will hereinafter be set forth.

The articles of manufacture and method of making the same which are illustrative of the present invention may be more readily understood by referring to the following examples:

EXAMPLE 1

A non woven cloth from Chicopee Mills 1/16 inch thick and 12 inches square was coated on one side thereof with a 20 percent solution of seran resin in methylethyl ketone. The solution was solvent dried to leave a film 10 mils thick on one side of the non woven cloth. The seran is a polyvinyl copolymer that is water impermeable. A substrate material, in this case a mylar polyester from DuPont 12 × 12 inches square, was coated on one surface thereof with a silicone based adhesive SR–585 available from General Electric. The adhesive was solvent dried under ambient conditions until all the toluene solvent was removed. The side of the non woven cloth opposite to the side covered with the seran resin was saturated with a solution composed of the following constituents:

a. 3 grams of high molecular weight;
b. 99 percent hydrolyzed polyvinyl alcohol from AIRCO and sold under the trade designation V–165;
c. 24 grams of water;
d. 2.2 grams of hydrated magnesium chloride;
e. 14.8 grams of glutaraldehyde; and
f. 0.4 grams of formaldehyde.

Constituents (a) to (c) were heated to boiling and thereafter constituents (d) to (f) were added.

The mixture was stirred and used to saturate the side of the non woven cloth opposite to the side with the seran thereon. The side of the non woven cloth with the above mixture thereon was placed over the exposed surface of the silicone resin. The entire construction was thereafter oven dried at 160° F. for 20 minutes to convert the liquid mixture into a water holding gel. The construction was thereafter left at 80° F. in a 20 percent relative humidity environment for 24 hours prior to the stripping of the non woven cloth from the adhesive. The non woven cloth was easily stripped from the adhesive exposing one surface of the adhesive which was thereafter contacted with a second sheet of 12 × 12 inches mylar film. The resulting sandwich of two strips of mylar film secured together by the silicone resin was impossible to separate without destroying the film.

The General Electric adhesive SR–585 has a solids content of 55 percent by weight, a specific gravity at 25° C. of 0.99, a light straw color, a viscosity C.P. at 25° C. in a range of between 1,000 and 8,000 and a flashpoint of 40° F.

EXAMPLE 2

Example 1 was repeated except that the non woven cloth having the seran resin on one side thereof and the mixture on the other side thereof was heated to form a water holdin gel prior to the application of the non woven cloth to the adhesive. In heating to form the gel prior to applying the release liner to the adhesive, it is required to make sure that the water once the gel has been formed and the release liner applied to the adhesive with the gel in contact therewith, the release liner performed satisfactorily and in the same manner as set forth in example 1.

EXAMPLE 3

A construction similar to that produced in Example 1 was made with the exception that the edges of the 12 × 12 inches combination of non woven cloth, adhesive and substrate were coated with a seran solution thereby to provide a water impermeable film along the edges. Since the seran is water impermeable, the addition of seran to the edges prevents any evaporation of water through the edges of the construction, thereby enabling the above construction with protected edges to be stored indefinitely at elevated temperatures and low relative humidity. Whereas the construction set forth in Example 1 showed the effects of water loss after storage for several days in the environment set forth in the example. No water loss was detected from the construction set forth in this example after storage in an 80° F. and 20 percent relative humidity environment for 4 days. The release liner is easily stripped from the adhesive since the seral coating at the edges is very thin and easily torn, whereby the release liner having an edge protecting film or water barrier functions with the same ease as a release liner without the edge protection but may be stored for much longer periods of time.

EXAMPLE 4

Example 3 was repeated using mylar polyester in place of seran with the same results.

EXAMPLE 5

Example 1 was repeated using a polysaccharide in lieu of the polyvinyl alcohol to form the water holding gel. The construction so made performs satisfactorily in the same manner as set forth in Example 1.

EXAMPLE 6

The construction of Example 1 was repeated substituting polyvinyl pyrollidine for the polyvinyl alcohol. The water holding gel thus produced performs satisfactorily and in the same manner as set forth in Example 1.

EXAMPLE 7

The construction of Example 1 was again repeated using polyacrylamine in lieu of the polyvinyl alcohol. The water holding gel thus produced performed in a satisfactory manner similar to that set forth in Example 1.

EXAMPLE 8

Example 1 was again repeated using certain natural grains such as corn, rice and tapioca. Where it was possible to cross-link the natural grains, they formed satisfactory water holding materials and performed adequately in release liner constructions.

EXAMPLE 9

Example 1 was repeated using a water insoluble, pressure sensitive adhesive obtained from General Electric under the trade designation SR–529 which is a silicone resin and gum adhesive. The release liner performed satisfactorily and easily released from the adhesive. The General Electric adhesive SR–529 has a solids content of 55 percent by weight, a specific gravity at 25 percent C. of 1.0, a light straw color, a viscosity C.P. at 25° C. and range of between about 1,000 and 5,000 and a flashpoint of 40° F.

EXAMPLE 10

Example 2 was repeateed using a General Electric silicone base, water insoluble, pressure sensitive adhesive SR–516. The release liner easily released from the adhesive.

EXAMPLE 11

Example 3 was repeated using a silicone resin adhesive sold by the Dow Chemical Company under the trade designation X-3-0483. The release liner performed satisfactorily as set forth above and easily released from the adhesive.

EXAMPLE 12

The release liner set forth in Example 5 was used to release from an adhesive sold by Wilholt Glues, Inc., under the trade designation 2A128, which adhesive is a rubber based contact adhesive. The release liner easily released from the adhesive.

EXAMPLE 13

The release liner set forth in Example 6 was used to release from a Kraton contact adhesive sold by Minnesota Mining & Manufacturing Company under the trade designation 4693. The release liner easily released from the adhesive.

EXAMPLE 14

The release liner set forth in Example 7 was used to release from the rubber based contact adhesive sold by Wilholt Glue, Inc. The release liner easily released from the adhesive.

EXAMPLE 15

The release liner construction set forth in Example 1 was repeated using a fine mesh rather than the non woven cloth. A satisfactory release liner was produced which held the water impermeable seran on one side thereof and the water holding gel on the other side thereof.

EXAMPLE 16

The construction set forth in Example 1 was again produced using a woven cloth instead of the non woven cloth set forth in Example 1. The construction performed in the same manner as set forth in Example 1 and easily released from the adhesive.

EXAMPLE 17

The construction set forth in Example 1 was again produced substituting an absorbent paper for the non woven cloth set forth in Example 1. The construction performed satisfactorily and easily released from the adhesive.

EXAMPLE 18

A thin film of water impermeable silicone rubber 12 × 12 inches square was sprayed on one side thereof with microencapsulated water in seran. The microcapsules adhered to the one side of the silicone rubber. The construction was overlaid against a 12 × 12 inches thin aluminum plate having the Dow X-3-0483 adhesive on one side thereof. The silicone rubber firmly adhered to the adhesive and could not be removed therefrom. The microcapsules were broken by applying a rolling pressure against the exposed surface of the silicone rubber after which the silicone rubber was easily peeled from the adhesive. The aluminum plate was thereafter pressed against a second aluminum plate. The adhesivve formed a strong bond between the two aluminum plates which could not be pried apart by hand.

EXAMPLE 19

An absorbent paper was coated on one side thereof with a seran film as set forth in Example 1. The other side of the absorbent paper was saturated with water and the saturated side of the seran coated paper was thereafter laid against a 12 × 12 inches steel square having the General Electric SR-585 silicone based adhesive thereon. The steel square with the adhesive and wet paper applied thereto was dipped into a 20 percent solution of seran resin in methylethyl ketone so as to cover the edges of the steel square and the water saturated paper. After the solvent evaporated a thin film of seran covered all the edges of the steel square and the paper. This construction was stored for four days at a temperature of about 80°F and a relative humidity of about 20 percent. After four days the paper was easily stripped or peeled from the steel square thereby exposing the adhesive which was thereafter pressed against a second steel square 12 × 12 inches. The subsequent bond formed between the two steel squares was strong and could not be broken by hand.

While there has been described what is at present considered to be the preferred embodiment of the present invention, it will be understood that various modifications and alterations may be made herein without departing from the true spirit and scope of the present invention, and it is intended to cover in the appended claims all such modifications and alterations as fall within the true spirit and scope of the present invention.

What is claimed is:

1. A release liner for a water insoluble, pressure sensitive adhesive, comprising a film having a water impermeable side and a water holding side, whereby said release liner placed on a water insoluble, pressure sensitive adhesive with said water holding side in contact with the adhesive provides a protective release liner which is easily removable to expose the adhesive in condition for use.

2. The release liner set forth in claim 1, wherein said water impermeable side is a polyester.

3. The release liner set forth in claim 1, wherein said water impermeable side is a polyvinyl copolymer.

4. A release liner for a water insoluble, pressure sensitive adhesive, comprising a film having a water impermeable side thereof and a water holding cross-linked synthetic organic resin side thereof, whereby said release liner placed on a water insoluble, pressure sensitive adhesive with said water holding cross-linked synthetic organic resin side in contact with the adhesive provides a protective release liner which is easily removable to expose the adhesive in condition for use.

5. The release liner set forth in claim 4, wherein said cross-linked synthetic organic resin is a polysaccharide.

6. The release liner set forth in claim 4, wherein said cross-linked synthetic organic resin is a polyvinyl alcohol.

7. The release liner set forth in claim 4, wherein said cross-linked synthetic organic resin is a polyvinyl pyrollidine.

8. The release liner set forth in claim 4, wherein said cross-linked synthetic organic resin is a polyacrylamide.

9. A release liner for a water insoluble, pressure-sensitive adhesive, comprising a carrier having opposed surfaces, a water impermeable film carried by said carrier on one surface thereof, and a water holding material carried by said carrier on the other surface thereof, whereby said carrier having said water holding material on one surface thereof placed on a water insoluble, pressure-sensitive adhesive provides a protective release liner which is easily removable from the adhesive to expose the adhesive in condition for use.

10. The release liner set forth in claim 9, wherein said carrier is a non woven cloth.

11. The release liner set forth in claim 9, wherein said carrier is a woven cloth.

12. The release liner set forth in claim 9, wherein said carrier is a mesh.

13. The release liner set forth in claim 9, wherein said carrier is paper.

14. The release liner set forth in claim 9, wherein said carrier is a synthetic organic resin.

15. A release liner for a water insoluble, preessure-sensitive adhesive, comprising a carrier having opposed surfaces, a water impermeable film carried by said carrier on one surface thereof, and a water holding cross-linked synthetic organic resin carried by said carrier on the other side thereof, whereby said carrier having said water holding resin on one surface thereof placed on a water insoluble, pressure-sensitive adhesive provides a protective release liner which is easily removable from the adhesive to expose the adhesive in condition for use.

16. A substrate having a water insoluble, pressure sensitive adhesive on one surface thereof, a release liner including a water impermeable side and a water holding side with said water holding side overlying said adhesive, whereby said release liner is easily peelable from said water insoluble, pressure sensitive adhesive to expose the adhesive in condition for use.

17. The article set forth in claim 16, wherein said adhesive is a silicone based adhesive.

18. The article set forth in claim 16, wherein said adhesive is a rubber based adhesive.

19. The article set forth in claim 16, wherein said adhesive is a polyurethane based adhesive.

20. The article set forth in claim 16, wherein said adhesive is a polyacrylic based adhesive.

21. A substrate having a water insoluble, pressure sensitive adhesive on one surface thereof, a release liner including a water impermeable side and a water holding cross-linked synthetic organic resin side thereof with said water holding side overlying said adhesive, whereby said release liner is easily peelable from said water insoluble, pressure sensitive adhesive to expose said adhesive in condition for use.

22. A substrate having a water insoluble, pressure sensitive adhesive on one surface thereof, a release liner including a water impermeable side and a water holding side with said water holding side overlying said adhesive, and a water barrier covering the edges of said release liner and said adhesive to prevent water from evaporating therefrom, whereby said release liner is easily peelable from said water insoluble, pressure sensitive adhesive to expose the adhesive in condition for use.

23. The article set forth in claim 22, wherein said water barrier is a water impermeable film.

24. The article set forth in claim 22, wherein said water barrier is a polyester film.

25. The article set forth in claim 22, wherein said water barrier is a polyvinyl film.

26. A substrate having a water insoluble pressure-sensitive adhesive on one surface thereof, a release liner including a carrier having opposed surfaces, a water impermeable film carried by said carrier on one surface thereof, and a water holding material carried by said carrier on the other surface thereof, whereby said release liner is easily peelable from said water insoluble, pressure-sensitive adhesive to expose said adhesive in condition for use.

27. A substrate having a water insoluble pressure sensitive adhesive on one surface thereof, a release liner including a carrier having opposed surfaces, a water impermeable film carried by said carrier on one surface thereof, and a water holding cross-linked synthetic organic resin carried by said carrier on the other side thereof, whereby said release liner is easily peelable from said water insoluble, pressure sensitive adhesive to expose said adhesive in condition for use.

28. A substrate having a water insoluble, pressure sensitive adhesive on one surface thereof, a release liner including a carrier having opposed surfaces, a water impermeable film carried by said carrier on one surface thereof, a water holding material carried by said carrier on the other surface thereof, and a water barrier covering the edges of said release liner and said adhesive to prevent water from evaporating therefrom, whereby said release liner is easily peelable from said water insoluble, pressure sensitive adhesive to expose said adhesive in condition for use.

* * * * *

UNITED STATES PATENT OFFICE
CERTIFICATE OF CORRECTION

Patent No. 3,850,784          Dated November 26, 1974

Inventor(s) Ardis R. Lavender

It is certified that error appears in the above-identified patent and that said Letters Patent are hereby corrected as shown below:

Assignee should read --Ardis R. Lavender--;

Column 1, line 31, "decrase" should be --decrease--;

line 44, "wtaer" should be --water--;

Column 2, line 54, "matrial" should be --material--;

Column 4, line 49, "of" should be --or--;

Column 5, line 51, "holdin" should be --holding--;

Column 6, line 62, "repeateed" should be --repeated--; and

Column 9, line 16, "preessure" should be --pressure--.

Signed and sealed this 11th day of February 1975.

(SEAL)
Attest:

RUTH C. MASON
Attesting Officer

C. MARSHALL DANN
Commissioner of Patents
and Trademarks